US009981251B2

(12) United States Patent
Kato et al.

(10) Patent No.: US 9,981,251 B2
(45) Date of Patent: May 29, 2018

(54) EXHAUST GAS TREATMENT SYSTEM

(71) Applicant: UMICORE AG & CO. KG, Hanau-Wolfgang (DE)

(72) Inventors: Naohiro Kato, Frankfurt (DE); Franz Dornhaus, Rodgau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days. days.

(21) Appl. No.: 15/319,243

(22) PCT Filed: Jun. 15, 2015

(86) PCT No.: PCT/EP2015/063255
§ 371 (c)(1),
(2) Date: Dec. 15, 2016

(87) PCT Pub. No.: WO2015/139210
PCT Pub. Date: Dec. 23, 2015

(65) Prior Publication Data
US 2017/0128914 A1    May 11, 2017

(30) Foreign Application Priority Data

Jun. 16, 2014  (EP) .................................... 14172507

(51) Int. Cl.
| *B01D 53/56* | (2006.01) |
| *B01D 53/94* | (2006.01) |
| *B01J 23/10* | (2006.01) |
| *B01J 23/40* | (2006.01) |
| *F01N 3/20* | (2006.01) |
| *F01N 3/28* | (2006.01) |
| *B01J 23/63* | (2006.01) |
| *B01J 29/76* | (2006.01) |
| *B01J 35/00* | (2006.01) |
| *F01N 3/10* | (2006.01) |
| *F01N 13/00* | (2010.01) |

(52) U.S. Cl.
CPC .......... *B01J 23/63* (2013.01); *B01D 53/9418* (2013.01); *B01D 53/9477* (2013.01); *B01J 29/763* (2013.01); *B01J 35/0006* (2013.01); *F01N 3/103* (2013.01); *F01N 3/2066* (2013.01); *F01N 3/2825* (2013.01); *F01N 13/009* (2014.06); *B01D 2255/1021* (2013.01); *B01D 2255/1023* (2013.01); *B01D 2255/2063* (2013.01); *B01D 2255/2092* (2013.01); *B01D 2255/20761* (2013.01); *B01D 2255/504* (2013.01); *B01D 2255/904* (2013.01); *B01D 2255/9155* (2013.01); *F01N 2330/30* (2013.01)

(58) Field of Classification Search
CPC .. B01D 53/56; B01D 53/565; B01D 53/9409; B01D 53/9413; B01D 53/9418; B01D 53/9431; B01D 2255/102; B01D 2255/2063; B01J 23/10; B01J 23/40; B01J 29/7015; F01N 3/103; F01N 3/2066; F01N 3/28
See application file for complete search history.

(56) References Cited

U.S. PATENT DOCUMENTS

| 3,993,572 A * | 11/1976 | Hindin ............... B01D 53/9413 423/213.5 |
| 5,556,825 A * | 9/1996 | Shelef .................. B01D 53/945 423/213.5 |
| 5,672,557 A * | 9/1997 | Williamson ......... B01D 53/945 502/303 |
| 5,851,950 A * | 12/1998 | Rossin ................... B01D 53/54 423/235 |
| 6,709,643 B1 * | 3/2004 | Ozkan ................ B01D 53/8628 423/239.1 |
| 7,459,135 B2 * | 12/2008 | Pieterse ............. B01D 53/8628 423/239.1 |
| 7,678,734 B2 | 3/2010 | Chigapov et al. |
| 7,802,420 B2 * | 9/2010 | Poojary .............. B01D 53/9477 422/170 |
| 8,226,896 B2 * | 7/2012 | Pfeifer ............... B01D 53/9468 422/171 |

(Continued)

FOREIGN PATENT DOCUMENTS

| DE | 102009024158 A1 | 12/2010 | |
| EP | 1199096 | 4/2002 | |
| EP | 2153896 A1 | 2/2010 | |
| EP | 2289846 | 3/2011 | |
| EP | 2481473 A2 | 8/2012 | |
| JP | 2004188388 A * | 7/2004 | ............... F01N 3/02 |
| WO | 00/62923 A1 | 10/2000 | |

OTHER PUBLICATIONS

Sakamoto et al. Effect of the addition of Fe on catalytic activities of $Pt/Fe/\gamma\text{-}Al_2O_3$ catalyst. Applied Catalysis B: Environmental 23 (1999) 159-167.
International Search Report for PCT/EP2015/063255, dated Aug. 14, 2015 in English Language.
Written Opinion of the International Searching Authority for PCT/EP2015/063255, dated Aug. 14, 2015 in English Language.

*Primary Examiner* — Timothy C Vanoy
(74) *Attorney, Agent, or Firm* — Smith, Gambrell & Russell, LLP

(57) ABSTRACT

The present invention provides an exhaust gas treatment system comprising an oxidation catalyst and an SCR catalyst, wherein the oxidation catalyst comprises an inert ceramic or metal honeycomb body and a catalytically active coating comprising a platinum group metal supported on a refractory support oxide and lanthanum wherein lanthanum is present in an amount of at least 13% by weight calculated as $La_2O_3$ and based on the weight of the refractory support material.

20 Claims, No Drawings

(56) References Cited

U.S. PATENT DOCUMENTS

| | | | |
|---|---|---|---|
| 8,883,100 B2* | 11/2014 | Paulus | B01D 53/9468 422/170 |
| 9,073,010 B2* | 7/2015 | Andreasson | B01D 53/9431 |
| 2005/0119119 A1 | 6/2005 | Rogers et al. | |
| 2005/0265920 A1 | 12/2005 | Ercan et al. | |
| 2014/0050627 A1* | 2/2014 | Mende | B01D 53/944 422/171 |

* cited by examiner

EXHAUST GAS TREATMENT SYSTEM

The present invention relates to the purification of exhaust gas of lean-burn internal combustion engines, in particular Diesel engines, of motor vehicles.

The exhaust gas of diesel engines typically comprises carbon monoxide CO, hydrocarbons HC and nitrogen oxides $NO_x$, as well as a relatively high oxygen content of up to 15% by volume. In addition, particulate emissions are present, these consisting predominantly of solid soot residue and possibly organic agglomerates and originating from partially incomplete fuel combustion in the cylinder.

The carbon monoxide and hydrocarbon pollutant gases can be rendered harmless by oxidation over a suitable oxidation catalyst. Diesel oxidation catalysts for oxidative removal of carbon monoxide and gaseous hydrocarbons have long been known in the prior art and have been described in a wide variety of different embodiments. Usually, platinum group metals, in particular platinum and/or palladium are used as active components in these catalysts. Such active components are usually provided on one or more support oxides, for example aluminum oxide or aluminum-silicon mixed oxide. Such oxides are frequently stabilized by the addition of about 1 to about 10, in particular about 4% by weight of lanthanum oxide.

$NO_x$ emissions are still a subject of environmental concern. One approach is to use the so-called selective catalytic reduction (SCR) to reduce $NO_x$ to nitrogen with ammonia released from urea solution as reducing agent. SCR catalysts can be supported on flow through substrates, as well as on filters like wall-flow filters (SDPF).

While the $NO_x$ fraction of the exhaust gas predominantly comprises nitrogen monoxide $NO_x$, the reaction of $NO_x$ to nitrogen over an SCR catalyst is strongly affected by the ratio of $NO_2$ in total $NO_x$. In order to achieve said ratio, upstream oxidation catalysts are used to produce exhaust gas with the appropriate $NO_2$ to $NO_x$ ratio.

Oxidation catalysts should ideally provide said $NO_2$ to $NO_x$ ratio throughout the lifetime of the vehicle. The activity of presently known oxidation catalysts, however, decrease due to unavoidable thermal degradation processes. Consequently, they are designed to provide the appropriate $NO_2$ to $NO_x$ ratio even at the end of the vehicle's lifetime with the consequence that the $NO_2$ to $NO_x$ ratio is usually too high at the fresh state of the catalyst.

There is therefore a need for oxidation catalysts and exhaust gas treatment systems comprising oxidation catalysts which provide the appropriate $NO_2$ to $NO_x$ ratio constantly over the complete lifetime of the vehicle.

EP 2 153 896 A1 discloses a $NO_x$ purification catalyst which includes a first catalyst layer that is supported on a carrier and includes a noble metal containing at least platinum as a main component, a cerium-containing material, and a lanthanum-containing material. In an aspect of that invention the NOx purification catalyst further includes a second layer that is formed as a layer on or mixed with the first catalyst layer and includes a solid acid that is ion-exchanged and/or mixed with a metal and has ammonia adsorption capability. In the latter design the exhaust gas comes at first in contact with the solid acid and subsequently with the platinum containing layer or it comes into contact with both materials at the same time.

The inventors of the present invention surprisingly found that modification of oxidation catalysts comprising platinum group metals with lanthanum reduces too high $NO_2$ formation in the fresh state without destroying the performance after thermal degradation too much.

The present invention accordingly relates to an exhaust gas treatment system comprising an oxidation catalyst and an SCR catalyst, wherein the oxidation catalyst comprises an inert ceramic or metal honeycomb body and a catalytically active coating comprising a catalytic material comprising a platinum group metal supported on a refractory support oxide and lanthanum characterized in that lanthanum is present in an amount of at least 13% by weight calculated as $La_2O_3$ and based on the weight of the refractory support material.

The amount of lanthanum is preferably 13 to 100% by weight calculated as $La_2O_3$ and based on the weight of the refractory support oxide and especially preferably 25 to 95% by weight calculated as $La_2O_3$ and based on the weight of the refractory support oxide. Embodiments of the present invention comprise lanthanum in amounts of 25 to 80, 50 to 95, 50 to 80 or 25 to 50% by weight calculated as $La_2O_3$ and based on the weight of the refractory support oxide Platinum group metals are preferably selected from the group consisting of platinum, palladium, rhodium and mixtures of at least two of them.

In preferred embodiments of the invention the catalytic material comprises platinum, palladium or platinum and palladium as platinum group metals.

In case the catalytic material comprises platinum and palladium the ratio Pt:Pd is preferably 1:2 to 12:1, for example 1:1, 6:1, 10:1 or 12:1.

Preferred refractory support oxides are aluminum oxide, silicon dioxide, titanium dioxide, aluminum-silicon mixed oxides, cerium oxide, zirconium oxide, cerium-zirconium mixed oxides or mixtures of at least two of these materials.

Preferred embodiments of the catalytic material comprise an aluminum-silicon mixed oxide as refractory support oxide.

The catalytic material can be manufactured by known methods, in particular by mixing the components or precursors thereof in an aqueous medium and drying and calcining the suspension obtained. In preferred methods, however, the suspension mentioned above is directly used as a coating suspension (washcoat) to coat catalyst substrates as described below.

The required amount of lanthanum in the catalytic material can be added as lanthanum oxide $La_2O_3$, as lanthanum nitrate $La(NO_3)_3$ or as any other manageable lanthanum compound.

In addition the required amount of lanthanum can be an integral part of the refractory support oxide. For example, it is possible to use as refractory support oxide alumina which contains the required amount of lanthanum, like alumina comprising 13% by weight of lanthanum calculated as $La_2O_3$ and based on the weight of the alumina.

It is also possible to use commercially available alumina which is stabilized with lanthanum, for example with 4% of lanthanum and add the outage in form $La_2O_3$ or $La(NO_3)_3$.

Platinum group metals are preferably introduced into the catalytic material by impregnation, by sorption, by precipitation and by "incipient wetness" methods known in the literature.

Preferably, platinum is introduced in the form of a suitable water-soluble precursor compound into a suspension containing the refractory support oxide, in particular aluminum oxide and/or aluminum-silicon mixed oxide, and fixed on the said support oxide in a defined way by sorption and/or precipitation.

The coating suspension prepared in this way, in which platinum exists pre-fixed on aluminum oxide or aluminum-silicon mixed oxide in the required quantity, is ground and applied to the catalyst substrate.

The catalytic material is used as a coating on a catalyst substrate which preferably is an inert ceramic or metal honeycomb body. The thus obtained oxidation catalyst comprises an inert ceramic or metal honeycomb body and a catalytically active coating comprising a catalytic material comprising
- a platinum group metal supported on a refractory support oxide and
- lanthanum characterized in that lanthanum is present in amount of at least 13% by weight calculated as $La_2O_3$ and based on the weight of the refractory support material.

Preferred inert ceramic or metal honeycomb bodies are flow-through or wall flow filter monoliths. Ceramic honeycomb bodies are preferably cordierite or silicon carbide bodies whereas metal honeycomb bodies are preferably made of aluminum titanate.

In preferred embodiments the inert ceramic or metal honeycomb body carries the catalytic material in amounts of from 1 g/ft³ (0.035315 g/L) to 220 g/ft³ (7.76923 g/L), based on the volume of the honeycomb body.

The amount of platinum group metal is preferably 3 to 25 g/ft³ (0.11 to 0.88 g/l), based on the volume of the honeycomb body.

The coating of the honeycomb body is preferably performed via conventional immersion, suction and pumping methods which are extensively described in literature and known to person of skill in the art. The coating is usually followed by calcination and optionally thermal reduction in an atmosphere which contains forming gas.

The resulting oxidation catalyst is suitable for the treatment of diesel exhaust gases, the treatment of the exhaust gas being carried out by passing the exhaust gas over the oxidation catalyst. In particular, the oxidation catalyst according to the invention provides the appropriate $NO_2$ to $NO_x$ ratio for the upstream SCR catalyst constantly over the complete lifetime of a vehicle.

Accordingly, the present invention further relates to a method for providing a constant $NO_2$ to $NO_x$ ratio in an exhaust gas which is appropriate for an SCR catalyst which forms part of an exhaust gas treatment system together with an oxidation catalyst as described above, characterized in that the exhaust gas is passed over the oxidation catalyst before contacting the SCR catalyst.

The oxidation catalyst is part of the inventive exhaust gas treatment system together with an SCR catalyst. When in use the oxidation catalyst is arranged in said exhaust gas treatment system upstream of the SCR catalyst.

Preferably, oxidation catalyst and SCR catalyst are coated on different substrates.

The SCR catalysts may be coated on a flow through substrate or on a wall flow filter substrate. Such substrates are of the type described above. Accordingly, they are preferably inert ceramic or metal honeycomb bodies of cordierite, silicon carbide or aluminum titanate.

Suitable SCR catalysts are based on mixed oxides or on zeolites wherein the latter may be metal exchanged. Examples are in particular zeolites like β-zeolite, ZSM-5, LEV, CHA and SAPO and ALPO materials which may be exchanged with Cu or Fe. Preferred SCR catalysts are Cu-LEV, Cu-CHA and Cu-SAPO-34.

In embodiments of the inventive exhaust gas treatment system it comprises a metering system for metering urea solution into the exhaust gas stream downstream of the oxidation catalyst and upstream of the SCR catalyst. The urea dosed into the exhaust gas stream is hydrolyzed to form ammonia which reacts with NOx in the SCR reaction to from nitrogen and water.

Metering systems which can be used according to the present invention are known to the skilled person and obtainable on the market place.

COMPARISON EXAMPLE 1 a) A catalytic material was produced as follows:

Platinum and palladium in the form of nitrate were added slowly to the aqueous suspension of a silica-alumina having high surface of about 150 m²/g. Base was added if necessary to keep the pH above 4.5. Then the suspension was milled to a mean particle size $D_{99}$ below 7 microns. The designation $D_{99}$ means, here, that the volume of the particles with particle sizes of below $D_{99}$ adds up to 99% of the volume of all the particles.

The components present in the washcoat were high surface area silica-alumina, Pt and Pd with a nominal Pt/Pd weight ratio of 12/1. The total loading of the washcoat was 10.09 g/L and the total amount of Pt and Pd in the washcoat were 0.35 g/L b) The catalytic material obtained according to section a) above was coated on a substrate as follows:

A wall flow filter having a volume of 2.47 L, a cell density of 300 cells per square inch, and a wall thickness of approximately 3.3 mm was coated with the oxidation catalyst washcoat obtained according to section a) above.

The washcoat suspension was pumped into the substrate from below until the inflow channels of the substrate were filled with suspension over their entire length. Then the washcoat was pumped out again from below and then extracted, wherein the pump-out or extraction power was selected such that the proportion of solids contained in the suspension remained in the channel walls of the wall flow filter substrate in the desired quantity. The resulting catalytically activated filter was calcined for a period of 4 hours at 350° C. and then treated with forming gas for 2 hours at 500° C.

Test cores having a volume of 0.077 L was drilled out from the full part for testing at synthetic gas test bench as described below where the catalyst thus obtained is called CC1.

COMPARISON EXAMPLE 2 a) A catalytic material was produced in line with Comparison Example 1, section a) above, with the exception that commercially available La stabilized alumina having high surface of about 200 m²/g was used instead of silica-alumina. The weight ratio of lanthanum oxide and the alumina part of high surface alumina for Pt/Pd support was 0.042.

b) The catalytic material obtained according to section a) above was coated on a substrate in line with Comparison Example 1, section b). In the tests described below the catalyst thus obtained is called CC2.

COMPARISON EXAMPLE 3 a) A catalytic material was produced in line with Comparison Example 1, section a) above, with the exception that 0.14 g/L of lanthanum oxide were added, which makes the total WC amount 10.23 g/L. The weight ratio of lanthanum oxide and the high surface alumina for Pt/Pd support was 0.014.

b) The catalytic material obtained according to section a) above was coated on a substrate in line with Comparison Example 1, section b). In the tests described below the catalyst thus obtained is called CC3.

EXAMPLE 1 a) A catalytic material was produced in line with Comparison Example 1, section a) above, with the exception that 1.36 g/L of lanthanum oxide were added which makes the total WC amount 11.45 g/L. The weight ratio of lanthanum oxide and the high surface alumina for Pt/Pd support was 0.14.

b) The catalytic material obtained according to section a) above was coated on a substrate in line with Comparison Example 1, section b).

In the tests described below the catalyst thus obtained is called C1.

EXAMPLE 2 a) A catalytic material was produced in line with Comparison Example 1, section a) above, with the exception that 2.72 g/L of lanthanum oxide were added which makes the total WC amount 12.81 g/L. The weight ratio of lanthanum oxide and the high surface alumina for Pt/Pd support was 0.28.

b) The catalytic material obtained according to section a) above was coated on a substrate in line with Comparison Example 1, section b). In the tests described below the catalyst thus obtained is called C2.

EXAMPLE 3 a) A catalytic material was produced in line with Comparison Example 1, section a) above, with the exception that 4.87 g/L of lanthanum oxide were added which makes the total WC amount 14.96 g/L. The weight ratio of lanthanum oxide and the high surface alumina for Pt/Pd support was 0.50.

b) The catalytic material obtained according to section a) above was coated on a substrate in line with Comparison Example 1, section b). In the tests described below the catalyst thus obtained is called C3.

EXAMPLE 4 a) A catalytic material was produced in line with Comparison Example 1, section a) above, with the exception that 7.79 g/L of lanthanum oxide were added which makes the total WC amount 17.88 g/L. The weight ratio of lanthanum oxide and the high surface alumina for Pt/Pd support was 0.80.

b) The catalytic material obtained according to section a) above was coated on a substrate in line with Comparison Example 1, section b). In the tests described below the catalyst thus obtained is called C4.

EXAMPLE 5 a) A catalytic material was produced in line with Comparison Example 1, section a) above, with the exception that 9.74 g/L of lanthanum oxide were added which makes the total WC amount 19.83 g/L. The weight ratio of lanthanum oxide and the high surface alumina for Pt/Pd support was 1.0.

b) The catalytic material obtained according to section a) above was coated on a substrate in line with Comparison Example 1, section b). In the tests described below the catalyst thus obtained is called C5.

EXAMPLE 6 a) A catalytic material was produced in line with Comparison Example 1, section a) above, with the exception that lanthanum nitrate hexahydrate equivalent to 1.35 g/L lanthanum oxide were added which makes the total WC amount 11.45 g/L. The weight ratio of lanthanum oxide and the high surface alumina for Pt/Pd support was 0.14.

b) The catalytic material obtained according to section a) above was coated on a substrate in line with Comparison Example 1, section b). In the tests described below the catalyst thus obtained is called C6.

EXAMPLE 7 a) A catalytic material was produced in line with Comparison Example 1, section a) above, with the exception that lanthanum nitrate hexahydrate equivalent to 2.72 g/L lanthanum oxide were added which makes the total WC amount 12.81 g/L. The weight ratio of lanthanum oxide and the high surface alumina for Pt/Pd support was 0.28.

b) The catalytic material obtained according to section a) above was coated on a substrate in line with Comparison Example 1, section b). In the tests described below the catalyst thus obtained is called C7.

Evaluation

The catalysts CC1 to CC3, as well as C1 to C7, prepared according to the examples described above were evaluated at a lab-reactor to determine the difference in $NO_2$ to $NO_x$ ratio at the catalyst outlet gas of fresh and aged catalyst.

Aging

The drilled cores from the prepared samples were treated hydrothermally (10% $H_2O$, 10% $O_2$, $N_2$ balance) in an oven at 750° C. for a duration of 16 hours.

Test Condition at Lab-Reactor

The core was placed in a lab-reactor and the synthesized exhaust gas containing 10% $O_2$, 45 ppm CO, 1100 ppm NO, 40 ppm C1 HC (2:1 mixture of $C_3H_6$ and $C_3H_8$), 10 ppm $H_2$, 7% $H_2O$, 7% $CO_2$, balance nitrogen at a total flow of 2000 L/h was passed through the core. The temperature of the synthesized gas was increased from 70° C. to 400° C. at a rate of 20° C./min and during the temperature increase, $NO_2$ to NOx ratio in the outlet gas was measured using conventional equipment. In case of evaluating fresh core, the synthesized gas heated up to 650° C. was passed through the core for a duration of 15 minutes prior to the evaluation as a pretreatment. The measured $NO_2$ to $NO_x$ ratio when the inlet gas temperature was about 300° C. and the decrease in it after aging were summarized as representative data in the following table.

| Catalyst | weight ratio $La_2O_3$ to support oxide | $NO_2$ to $NO_x$ ratio after aging (inlet gas temperature 300° C.) | decrease in $NO_2$ to $NO_x$ ratio after aging (inlet gas temperature 300° C.) |
|---|---|---|---|
| CC1 | 0 | 0.32 | 0.23 |
| CC2 | 0.042 | 0.32 | 0.22 |

-continued

| Catalyst | weight ratio La$_2$O$_3$ to support oxide | NO$_2$ to NO$_x$ ratio after aging (inlet gas temperature 300° C.) | decrease in NO$_2$ to NO$_x$ ratio after aging (inlet gas temperature 300° C.) |
|---|---|---|---|
| CC3 | 0.014 | 0.37 | 0.24 |
| C1 | 0.14 | 0.32 | 0.17 |
| C2 | 0.28 | 0.27 | 0.07 |
| C3 | 0.50 | 0.22 | 0.08 |
| C4 | 0.80 | 0.21 | −0.03 |
| C5 | 1.0 | 0.14 | 0.02 |
| C6 | 0.14 | 0.33 | 0.16 |
| C7 | 0.28 | 0.28 | 0.12 |

EXAMPLE 8

The oxidation catalyst according to Example 1b) (Catalyst C1) was combined with a usual flow-through substrate which was coated with a zeolite of the Chabazite type which comprised 3.5 wt. % of copper calculated as CuO (SCR catalyst) to form an inventive exhaust gas treatment system. When in use the exhaust gas first passes the oxidation catalyst and subsequently the SCR catalyst.

According to Example 8, additional inventive exhaust gas treatment systems can be obtained by combining the catalysts C2 to C7 with an SCR catalyst.

The invention claimed is:

1. Exhaust gas treatment system comprising an oxidation catalyst and an SCR catalyst, wherein the oxidation catalyst comprises an inert ceramic or metal honeycomb body and a catalytically active coating comprising a catalytic material comprising
    a platinum group metal supported on a refractory support oxide and
    lanthanum
wherein lanthanum is present in an amount of at least 13% by weight calculated as La$_2$O$_3$ and based on the weight of the refractory support oxide, and wherein
the catalytic material comprises, as platinum group metal, platinum and palladium wherein the ratio Pt:Pd is 1:2 to 12:1.

2. Exhaust gas treatment system according to claim 1, wherein in the catalytic material the amount of lanthanum is 13 to 100% by weight calculated as La$_2$O$_3$ and based on the weight of the refractory support oxide.

3. Exhaust gas treatment system according to claim 1, wherein in the catalytic material the amount of lanthanum is 25 to 80% by weight calculated as La$_2$O$_3$ and based on the weight of the refractory support oxide.

4. Exhaust gas treatment system according to claim 1, wherein in the catalytic material the refractory support oxide is selected from the group consisting of aluminum oxide, silicon dioxide, titanium dioxide, aluminum-silicon mixed oxides, cerium oxide, zirconium oxide, cerium-zirconium mixed oxides and mixtures of at least two of these materials.

5. Exhaust gas treatment system according to claim 1, wherein in the catalytic material the refractory support oxide is an aluminum-silicon mixed oxide.

6. Exhaust gas treatment system according to claim 1, wherein the SCR catalyst is based on mixed oxides or on zeolites.

7. Exhaust gas treatment system according to claim 1, wherein the SCR catalyst is based on zeolites selected from the group consisting of β-zeolite, ZSM-5, CHA, SAPO and ALPO materials.

8. Exhaust gas treatment system according to claim 1, wherein the SCR catalyst is Cu-CHA or Cu-SAPO-34.

9. Exhaust gas treatment system according to claim 1, wherein when in use the oxidation catalyst is arranged in said exhaust gas treatment system upstream of the SCR catalyst.

10. A method for providing an NO$_2$ to NO$_x$ ratio in an exhaust gas which is appropriate for an SCR catalyst which forms part of the exhaust gas treatment system according to claim 1, wherein the method comprising passing the exhaust gas over the oxidation catalyst before contacting the SCR catalyst.

11. Exhaust gas treatment system comprising an oxidation catalyst and an SCR catalyst, wherein the oxidation catalyst comprises an inert ceramic or metal honeycomb body and a catalytically active coating comprising a catalytic material comprising
    a platinum group metal supported on a refractory support oxide and
    lanthanum, and
wherein, in the catalytic material, the amount of lanthanum is 25 to 80% by weight calculated as La$_2$O$_3$ and based on the weight of the refractory support oxide.

12. Exhaust gas treatment system according to claim 11, wherein in the catalytic material the platinum group metal is selected from the group consisting of platinum, palladium, rhodium and mixtures of at least two of them.

13. Exhaust gas treatment system according to claim 11, wherein the catalytic material comprises, as platinum group metal, platinum, palladium or platinum and palladium.

14. Exhaust gas treatment system according to claim 11, wherein when in use the oxidation catalyst is arranged in said exhaust gas treatment system upstream of the SCR catalyst.

15. Exhaust gas treatment system according to claim 11, wherein the SCR catalyst is based on mixed oxides or on zeolites.

16. Exhaust gas treatment system comprising an oxidation catalyst and an SCR catalyst, wherein the oxidation catalyst comprises an inert ceramic or metal honeycomb body and a catalytically active coating comprising a catalytic material comprising
    a platinum group metal supported on a refractory support oxide and
    lanthanum, and
wherein the SCR catalyst is Cu-CHA or Cu-SAPO-34.

17. Exhaust gas treatment system according to claim 16, wherein the catalytic material comprises as platinum group metal platinum, palladium or platinum and palladium.

18. Exhaust gas treatment system according to claim 16, wherein when in use the oxidation catalyst is arranged in said exhaust gas treatment system upstream of the SCR catalyst.

19. A method for providing an NO$_2$ to NO$_x$ ratio in an exhaust gas which is appropriate for an SCR catalyst which forms part of the exhaust gas treatment system according to claim 11, the method comprising passing the exhaust gas over the oxidation catalyst before contacting the SCR catalyst.

20. A method for providing an NO$_2$ to NO$_x$ ratio in an exhaust gas which is appropriate for an SCR catalyst which forms part of the exhaust gas treatment system according to claim 16, the method comprising passing the exhaust gas over the oxidation catalyst before contacting the SCR catalyst.

* * * * *